United States Patent [19]

Yanagidaira

[11] Patent Number: 5,053,882
[45] Date of Patent: Oct. 1, 1991

[54] VIDEO SIGNAL OPTICAL TRANSMISSION SYSTEM

[75] Inventor: Masatoshi Yanagidaira, Tokyo, Japan

[73] Assignee: Pioneer Electronic Corporation, Tokyo, Japan

[21] Appl. No.: 321,244

[22] Filed: Mar. 9, 1989

[30] Foreign Application Priority Data

Sep. 13, 1988 [JP] Japan ................................ 63-227557

[51] Int. Cl.⁵ .......................... H04N 5/76; G02F 1/00
[52] U.S. Cl. .................................. 358/342; 358/336; 358/343; 359/173
[58] Field of Search ............... 455/600, 608, 617, 618; 358/343, 342, 341, 314, 336; 360/19.1

[56] References Cited

U.S. PATENT DOCUMENTS

| | | | |
|---|---|---|---|
| 4,243,849 | 1/1981 | Goshima et al. | 358/342 |
| 4,683,502 | 7/1987 | Higashi et al. | 358/342 |
| 4,805,040 | 2/1989 | Oku et al. | 360/36.1 |
| 4,815,063 | 3/1989 | Aoshima et al. | 369/50 |
| 4,912,524 | 3/1990 | Nakamura et al. | 455/608 |
| 4,928,318 | 5/1990 | Ibe et al. | 455/608 |

Primary Examiner—Roy N. Envall, Jr.
Assistant Examiner—Thai Tran
Attorney, Agent, or Firm—Sughrue, Mion, Zinn, Macpeak & Seas

[57] ABSTRACT

A video signal optical transmission system reproduces and transmits video and audio signals from an optical disk as pulsed FM signals which are converted to optical signals prior to transmission. No additional frequency modulation is required prior to transmission. With this transmission system, special demodulation circuitry no longer is required, so that existing demodulation circuitry on the receiving side can be used.

5 Claims, 3 Drawing Sheets

VIDEO SIGNAL OPTICAL TRANSMISSION SYSTEM

BACKGROUND OF THE INVENTION

The present invention relates to a Video signal optical transmission system which transmits the video signal from a transmitting part to a receiving part through an optical fiber transmission path.

In an optical fiber transmission system, for a community access television (CATV) system or the like, video signals are transmitted after being frequency modulated. This technique avoids the effect of wave distortion or the like which might result from insufficient linearity of a semiconductor laser used to transmit the video signal on the optical fiber.

FIG. 1 is a schematic block diagram of such a conventional optical transmission system. In FIG. 1, a frequency modulator 1b in a transmitting part 1 frequency modulates a composite video signal transmitted by video equipment such as a video camera and a video tape recorder (VTR). An electro-optical (E/O) converter 1c converts the resulting frequency modulated signal into an optical signal, and an optical fiber 2, serving as a signal transmission path, transmits the optical signal to a receiving part 3.

An opto-electrical (O/E) converter 3a in a receiving part 3 converts the optical signal transmitted through the optical fiber 2 to an electrical signal. A frequency demodulator 3b demodulates the resulting frequency modulated signal to obtain a composite video signal. The composite video signal is transmitted via a coaxial line or the like (not shown) to a terminal or the like where it is used for displaying a video or recording a picture in a video tape recorder (VTR).

As described above, in transmitting a video signal it has been necessary to provide a frequency modulator 1b on the transmitting side and a corresponding dedicated frequency demodulator 3b on the receiving side, the added circuitry raising the cost of the system.

SUMMARY OF THE INVENTION

In view of the foregoing, it is an object of the present invention to provide a reduced cost video signal optical transmission system which does not need a frequency modulator on the transmitting side.

The video signal optical transmission system of the present invention solves the above-mentioned problem, and is equipped with a transmitting part for sending out a video signal by converting it to an optical signal, and an optical fiber transmission path for transmitting the optical signal sent out from the transmitting part. The system also includes a receiving part for receiving the optical signal transmitted through the optical fiber by converting it to an optical signal. The transmitting part includes optical video disk reproducing means for outputting a pulsed FM signal, and electro-optical converting means for converting the pulsed FM signal into an optical signal. The receiving part includes opto-electrical converting means for converting an optical signal transmitted through the optical fiber to a pulsed FM signal, and frequency demodulating means for outputting a video signal by demodulating the pulsed FM signal from the opto-electrical converting means.

In accordance with this construction, a video signal is recorded on a video disk, and is reproduced by optical video disk reproducing means. The video signal is recorded as pits on an original plate, the pits being formed by turning on and off a laser beam with a pulsed FM signal obtained by amplitude-limiting a frequency modulated video wave formed by frequency modulating a video signal. Accordingly, a pulsed FM signal can be obtained by opto-electrically converting a laser beam which is diffracted by a pit in the disk and reflected. Since the pulsed FM signal is obtained by frequency modulating a video signal, it becomes possible to avoid such undesirable influence as distortion because of nonlinearity of a semiconductor laser in the electro-optical converting means by converting the pulsed FM signal to an optical signal with the electro-optical converting means and transmitting the optical signal through an optical fiber. Therefore, there is no longer any need to provide a dedicated frequency modulator on the transmission side.

In the receiving part, a pulsed FM signal is obtained by converting the optical signal transmitted through an optical fiber with the opto-electrical converting means. A video signal is obtained by demodulating the pulsed FM signal with a frequency demodulator. A demodulator, which is used generally for demodulating a reproduced RF signal in an optical video disk reproducing means, may be used as the frequency demodulator without modification. Thus, it is possible to share ICs, circuits and the like, thus further reducing the cost of the system.

BRIEF DESCRIPTION OF THE DRAWINGS

The present invention now will be described in detail with reference to the accompanying drawings, in which:

FIG. 2 shows a block diagram of an embodiment of the video signal optical transmission system of the present invention. A transmitting part 11 includes an optical video disk player (LDP) 11a and an electro-optical (E/O) converter 11b for converting a pulsed FM signal from the LDP 11a to an optical signal. The transmitting part 11 sends out an optical signal converted by the E/O converter 11b through an optical fiber transmission path 12. A receiving part 13 includes an opto-electrical (O/E) converter 13a for obtaining an original pulsed FM signal by converting an optical signal, transmitted from the transmitting part 11 through the optical fiber 12, to an electrical signal, and a frequency demodulator 13b for obtaining a composite video signal by demodulating the pulsed FM signal from the O/E converter 13a. The composite video signal from the frequency demodulator 13b is further transmitted to a terminal or the like via a coaxial line or the like.

Figure 3:
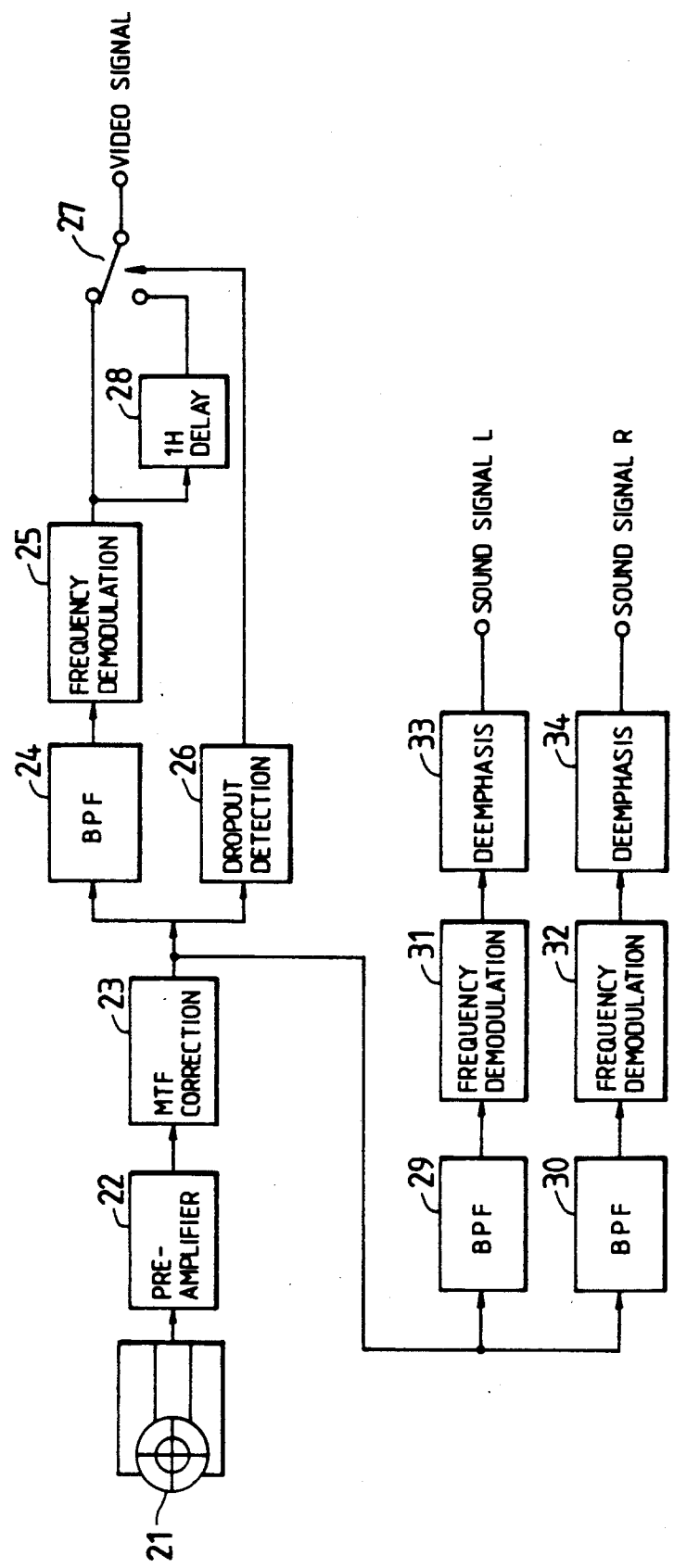
FIG. 3 is a block diagram of a circuit for the signal reproducing system of a general output video disk player.

Generally, the LDP 11a has a reproduction signal processing circuit as shown in FIG. 3. However, prior to explaining the circuit, the principle of recording on an optical video disk (LD) will be described.

In order to record a video and two-channel sound signals on an LD, a signal from software (such as a VTR tape or a movie film) first is converted by a signal processor to an FM signal waveform suitable for recording. The video signal and the two-channel sound signals are converted to a video FM carrier having a center frequency of 8.1 MHz and sound FM waves having center frequencies of 2.2 MHz and 2.8 MHz, respectively. The converted video and sound signals are synthesized and are further amplitude limited by a limiter to shape the synthesized wave to a rectangular wave. The rectangular wave is a pulsed version of an FM signal waveform which may be referred to as a pulsed FM signal. The result is a multiplexed signal whose repetition frequency and duty cycle represent video information and sound information, respectively. As may be seen from the spectrum of the recording signal shown in FIG. 4, the 4.2 MHz video signal bandwidth and the low frequency sideband of the video FM carrier in the baseband hardly overlap so that there is no mutual influence between them. Accordingly, by turning a laser beam on and off by applying a rectangular (pulsed FM signal) waveform output from the limiter to an optical converter, it is possible precisely to record pits on an original plate in helical tracks.

By photoelectrically converting, with a photodetector 21, a modulated laser beam which is diffracted and reflected from a pit on a video disk prepared from an original plate formed as above, an electrical signal is obtained. As described with reference to FIG. 4, included in this electrical signal are a frequency modulated video signal with a frequency shift width of 1.7 MHz (7.6–9.3 MHz) and two kinds of frequency modulated sound frequencies of center frequencies 2.3 MHz and 2.8 MHz with frequency shifts to ±100 kHz.

A reproduced RF signal obtained from the video disk is amplified by a preamplifier 22. The change in the reproduced frequency caused by the characteristic of a lens is corrected in a modulation transfer function (MTF) correction circuit 23, and a video FM carrier alone is separated by a bandpass filter (BPF) for the band 3.5–15 MHz and demodulated into a video signal by a frequency demodulator 25.

On the other hand, when there is a dropout in the reproduced signal due to a flaw, stain or the like on the disk, a switching circuit 27 is operated in accordance with a signal from a dropout detector 26 which detects the dropout in the RF signal, to replace the video signal during the dropout period alone with the signal which occurred 1H (63.5 μsec) earlier, in order to prevent the appearance of noise on the television screen. Here, the signal which occurred 1H before the dropout is obtained through a delay circuit 28 which uses a CCD.

In addition, as to the sound signal, after sound FM carriers are separated with a 2.3 MHz BPF 29 and a 2.8 MHz BPF 30 they are respectively demodulated by frequency demodulators 31 and 32, and then are output after undergoing deemphasis processing in deemphasis circuits 33 and 34.

The optical video disk player (LDP) 11a mentioned in connection with FIG. 2 can be anything which has, among the circuit components described in connection with FIG. 3, the photodetector 21, the preamplifier 22 and the MTF correction circuit 23, so long as the LDP can output a video FM carrier obtainable at the output of the MTF correction circuit 23 prior to frequency demodulation, and a pulsed FM signal that includes sound FM signals. A pulsed FM signal from the LDP 11a is converted to an optical signal in the E/O converter 11b, and the optical signal is sent out from the E/O converter 1b to the optical fiber 12 serving as a transmission p.

Figure 1:
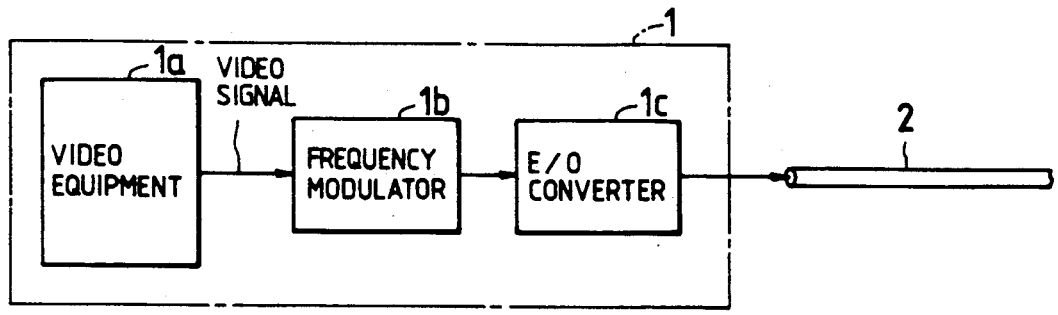
FIG. 1 is a block diagram of one example of a conventional video signal optical transmission system.
Figure 1:
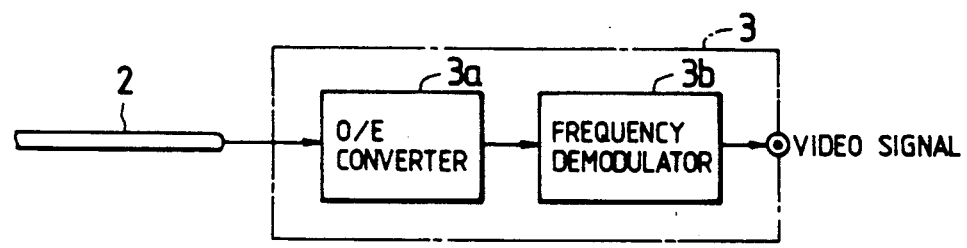
Figure 2:
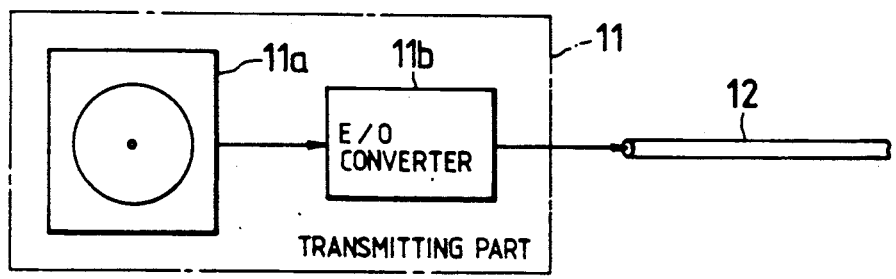
FIG. 2 is a block diagram of a video signal optical transmission system according to the present invention.
Figure 2:
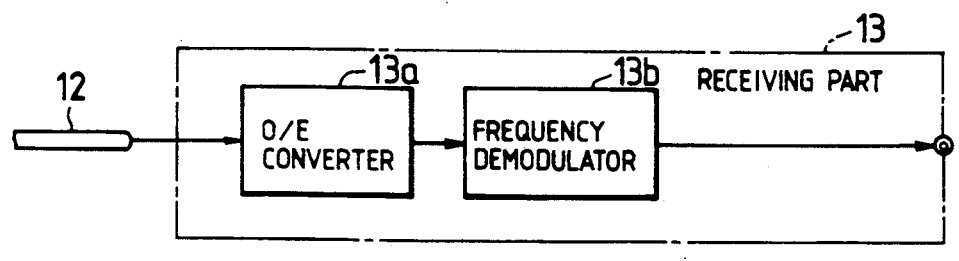
Figure 4:
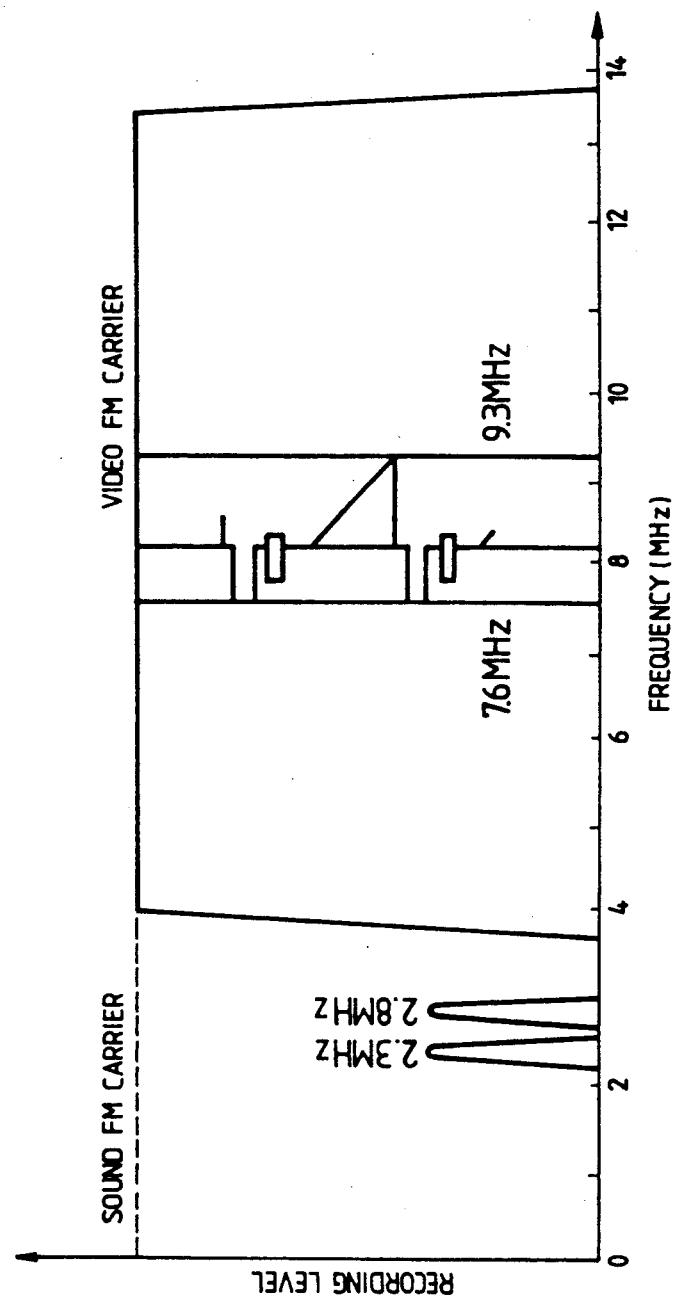
FIG. 4 is a diagram of the spectrum of a recording signal of a video disk.

On the other hand, the frequency demodulator 13b in the receiving part 13 of FIG. 2 is acceptable if it can obtain a composite video signal and sound signals by frequency demodulating a pulsed FM signal from the O/E converter 13a which converts an optical signal, transmitted from the transmitting part 11 through the optical fiber 12, to an electrical signal, and includes components labeled as 24 to 34 in the circuit construction mentioned in connection with FIG. 4.

As constructed above, the transmitting part 11 directly converts a pulsed FM signal, obtained by converting an optical signal picked up by the photodetector 21 of the LDP 11a to an electrical signal, to an optical signal which is sent out to the optical fiber 12. Since it converts a signal, which is already frequency modulated, to an optical signal, there is no need to provide a frequency modulator in the transmitting part 11. Further, the receiving part 13 obtains the original pulsed FM signal by converting an optical signal transmitted through the optical fiber 12 to an electrical signal so that it can use the same frequency demodulator as one used generally in the LDP for frequency demodulating a pulsed FM signal. Therefore, ICs and circuits in the existing LDP can be used as they are. The elimination of a frequency modulator in the transmitting part 11 and the use of existing components in the receiving part 13 achieve reduced system cost.

In the above embodiment, a pulsed FM signal obtained as an output from the MTF correction circuit 23 is converted to an optical signal by the E/O converter 11b in order to simplify the explanation. In reality, however, a large number of signals are transmitted by frequency division multiplex so that FM multiplex processing or the like often is carried out prior to E/O conversion.

Moreover, a video signal from the receiving part 13 either is viewed and listened to directly, or is transmitted to many pieces of terminal equipment by the use of a coaxial cable or the like, for viewing and listening or recording by various kinds of video equipment connected to each terminal equipment.

As described above, according to the present invention, the optical video disk reproducing means in the transmitting part outputs a pulsed FM signal obtained by frequency modulating a video signal reproduced from a video disk, and transmits the pulsed FM signal through the optical fiber by converting it to an optical signal with the electro-optical converting means. Therefore, there is no need to provide a frequency modulator in the transmitting part, reducing the cost of the system. Moreover, existing optical video disk reproducing means are used to frequency demodulate the pulsed FM signal in the receiving part so that ICs, circuits and the like can be shared, achieving further system cost reduction.

I claim:

1. A video signal optical transmission system for transmitting audio and video signals recorded on a video disk, said audio and video signals being recorded on said video disk by turning a laser beam on and off with a pulsed FM signal such that said audio and video signals are reproduced from said video disk as pulsed FM signals without additional modulation, said system comprising:

a transmitting unit for converting said audio and video signals to optical signals and outputting said optical signals, said transmitting unit including optical video disk reproducing means for reproducing said audio and video signals from said video disk as said pulsed FM signals, and electro-optical converting means for converting said pulsed FM signals to said optical signals;

an optical fiber transmission path, connected to said transmitting unit, for transmitting said optical signals; and a receiving unit for receiving said optical signals transmitted through said optical fiber transmission path and converting said optical signals to electrical signals, said receiving unit including opto-electrical converting means for converting said optical signals transmitted through said optical fiber to said pulsed FM signals, and frequency demodulating means for demodulating said pulsed FM signals from said opto-electrical converting means and outputting said demodulated pulsed FM signals as said audio and video signals.

2. A system as claimed in claim 1 wherein said receiving unit comprises a dropout detector for detecting a dropout in said electrical signal and a switching means for replacing the video signal during the dropout period detected by said dropout detector with an earlier signal which occurred 1H (63.5 μsec) before said dropout was detected, said earlier signal being stored as an analog signal.

3. A system as claimed in claim 1 wherein said audio and video signals recorded on said video disk are synthesized and amplitude limited, in order to form a synthesized rectangular wave.

4. A system as claimed in claim 1 wherein said audio signal includes a first audio signal with a center frequency of 2.3 MHZ and a second audio signal with a center frequency of 2.8 MHZ, said first and second frequencies each having a frequency shift of ±100kHZ.

5. A system as claimed in claim 1, said frequency demodulating means further comprising:

video bandpass filter means for separating said video signal from said pulsed FM signal, video signal frequency demodulator means for demodulating said video signal, audio bandpass filter means for separating said audio signals from said pulsed FM signal, audio signal frequency demodulator means for demodulating said audio signal, dropout detection means for detecting a dropout period in said pulsed FM signal, and switching means for replacing a portion of said demodulated video signal, which occurs during said dropout period, with an earlier portion of said demodulated video signal, said earlier portion occurring 1H (63.5 μsec) before said dropout period.

* * * * *